United States Patent
Finlay (10) Patent No.: US 11,519,230 B2
(45) Date of Patent: *Dec. 6, 2022

(54) SENSOR UNIT FOR MONITORING A TUBULAR

(71) Applicant: SALUNDA LIMITED, Oxfordshire (GB)

(72) Inventor: Alan Patrick John Finlay, Worcester (GB)

(73) Assignee: SALUNDA LIMITED, Oxfordshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/766,623

(22) PCT Filed: Nov. 26, 2018

(86) PCT No.: PCT/GB2018/053408
§ 371 (c)(1),
(2) Date: May 22, 2020

(87) PCT Pub. No.: WO2019/102222
PCT Pub. Date: May 31, 2019

(65) Prior Publication Data
US 2021/0010334 A1  Jan. 14, 2021

(30) Foreign Application Priority Data

Nov. 24, 2017 (GB) ................................. 1719589
Jan. 19, 2018 (GB) ................................. 1800892
(Continued)

(51) Int. Cl.
*E21B 19/14* (2006.01)
*G01D 5/12* (2006.01)

(52) U.S. Cl.
CPC ............... *E21B 19/14* (2013.01); *G01D 5/12* (2013.01)

(58) Field of Classification Search
CPC ............................. E21B 19/14; E21B 19/165
See application file for complete search history.

(56) References Cited

U.S. PATENT DOCUMENTS 4,621,974 A     11/1986  Krueger
10,132,660 B2 *  11/2018  Newton ................ G01D 11/30
(Continued)

FOREIGN PATENT DOCUMENTS

CA     3015167    *  2/2019  ............ E21B 19/14
EP     2338032 A2    6/2011
(Continued)

*Primary Examiner* — Lynn E Schwenning
(74) *Attorney, Agent, or Firm* — Marshall, Gerstein & Borun LLP (57) ABSTRACT

A sensor unit for a fingerboard latch assembly that comprises a latch bracket and a latch rotatably supported on the latch bracket is mountable on the latch. The sensor unit comprises a sensor configured to sense an adjacent tubular, and a processor that processes the output of the sensor to provide a tubular monitor signal representing the presence or absence of an adjacent tubular A wireless communication unit wirelessly communicates the tubular monitor signal. This allows a wireless sensor unit to be provided that is suitable for operation in remote locations and can verify the presence or absence of tubular to ensure it is securely stored in a fingerboard.

28 Claims, 9 Drawing Sheets

(30)      Foreign Application Priority Data

Jan. 31, 2018   (GB) ...................................... 1801608
Feb. 12, 2018   (GB) ...................................... 1802220
Jun. 26, 2018   (GB) ...................................... 1810456

(56)             References Cited

U.S. PATENT DOCUMENTS

| | | | |
|---|---|---|---|
| 10,240,408 B2* | 3/2019 | Finlay | F16L 3/00 |
| 10,246,952 B2* | 4/2019 | Trydal | G06K 9/78 |
| 10,472,903 B2* | 11/2019 | Kunec | E21B 19/14 |
| 10,597,953 B2* | 3/2020 | Finlay | E21B 47/09 |
| 10,677,000 B2* | 6/2020 | Albanese | F16L 3/00 |
| 2014/0091785 A1 | 4/2014 | Wherritt et al. | |
| 2016/0076920 A1* | 3/2016 | Newton | F16L 3/00 |
| | | | 248/65 |
| 2016/0187275 A1 | 6/2016 | Pickles et al. | |
| 2017/0114602 A1 | 4/2017 | Grace | |

FOREIGN PATENT DOCUMENTS

| | | | | |
|---|---|---|---|---|
| EP | 2554784 A2 | 2/2013 | | |
| EP | 3009594 A1 | 4/2016 | | |
| EP | 3460173 A1 * | 3/2019 | ......... | H03K 17/9545 |
| GB | 2532267 A | 5/2016 | | |
| WO | WO-2007/099282 A1 | 9/2007 | | |
| WO | WO-2012/012326 A1 | 1/2012 | | |
| WO | WO-2016/174439 A1 | 11/2016 | | |
| WO | WO-2018/007804 A1 | 1/2018 | | |
| WO | WO-2018007804 A1 * | 1/2018 | ............ | G01D 7/005 |
| WO | WO-2018011383 A1 * | 1/2018 | ............ | E21B 19/14 |
| WO | WO-2018/087511 A1 | 5/2018 | | |
| WO | WO-2018/167461 A1 | 9/2018 | | |

* cited by examiner

SENSOR UNIT FOR MONITORING A TUBULAR

CROSS-REFERENCE TO RELATED APPLICATIONS

This present application is the US national phase of International Patent Application No. PCT/GB2018/053408, filed Nov. 26, 2018, which claims priority to Great Britain Application No. 1719589.2, filed Nov. 24, 2017, Great Britain Application No. 1800892.0, filed Jan. 19, 2018, Great Britain Application No. 1801608.9, filed Jan. 31, 2018, Great Britain Application No. 1802220.2, filed Feb. 12, 2018, and Great Britain Application No. 1810456.2, filed Jun. 26, 2018. The priority applications are hereby incorporated by reference in their entireties.

FIELD

The present invention relates to a sensor unit for monitoring a tubular adjacent a fingerboard latch assembly.

BACKGROUND

Fingerboards are used to store tubulars, for example stands of drill pipes, drill collars, tools, bottom hole assemblies (BHA) and casings, used in the oil and gas industry, for example adjacent or inside a drilling derrick on an oil or gas rig. An array of horizontally extending fingerboards are provided between which the tubulars are vertically stacked. Latches are used to secure tubulars between the fingerboards. The latches are provided as part of fingerboard latch assemblies mounted to the fingerboards. Drill pipe is assembled into stands which are stored in 'slots' formed by closed latches in the fingerboard and bellyboard. A fingerboard latch assembly typically comprises: a latch bracket and a latch rotatably supported on the latch bracket. Latches close to retain tubular in slots.

Tubulars are secured using latches, and it is occasionally necessary to confirm that tubular is present in a slot, or that the slot is empty, for example before opening a latch. If a latch is erroneously opened and a tubular, such as a drill pipe, is present then it may fall out of the fingerboard with catastrophic consequences and even fatalities. This need to confirm the presence, or absence, of tubular in the fingerboard is sometimes referred to as the 'ghost pipe' problem. In a fingerboard filled with stands of pipe, for example, it can be difficult to discern whether or not pipe is present in a slot. Occasionally a latch is opened in error and pipe falls to the deck with devastating consequences. These serious incidents have created a requirement for a solution that can detect and confirm the location of a tubular in the derrick.

SUMMARY

Similarly the device of the invention may be mounted on the bails or linkage mechanism of a top drive to confirm the position and condition of the bails and elevator and to avoid dropped pipe or clashes with other equipment inside the derrick. According to a first aspect of the present invention, there is provided a sensor unit for monitoring a tubular adjacent a fingerboard latch assembly mounted on a fingerboard comprising a latch bracket and a latch rotatably supported on the latch bracket, wherein the sensor unit comprises: a sensor configured to sense an adjacent tubular; a processor arranged to receive the output of the sensor and to generate a signal representing the presence or absence of an adjacent tubular, and/or representing the position of an adjacent tubular.

Thus, the sensor unit senses an adjacent tubular and outputs a tubular monitor signal representing the presence or absence of an adjacent tubular, and/or representing the position of an adjacent tubular. The tubular monitor signal may used as an input to a handling system that handles the tubular or a control system controls the operation of associated fingerboard latches, for example the fingerboard latch assembly to which the tubular is adjacent and fingerboard latch assemblies which secure the same tubular or are in the same array of fingerboards. For example, the sensor unit may be used to track a tubular as it closes on a fingerboard latch and its output used in feedback to decelerate the motion of the piperacker moving the tubular. Likewise, the sensor unit could be used to interlock the latches or guide-head claws to ensure that pipe is not released until the latch is down and it is secure.

The sensor may implement any suitable sensing technology, for example one of ultrasonic, acoustic, electromagnetic, magnetic, radio-frequency, microwave, ultra-wideband, optical, infrared, imaging or inductive sensing.

The sensor may include two electromagnetic probes, for example coils, that are spaced apart. This improves the sensing capability by allowing the sensor to detect the position of the tubular relative to the two electromagnetic probes. For example, the output of the sensor may be a differential signal taken between the two electromagnetic probes. Similarly, the use of two probes maybe used to determine which side of the latch the tubular is present, and confirm tubular is present in the slot as the latch is closed or before it is opened.

The sensor unit may comprise a wireless communication unit, for example a radio communication unit, arranged to wirelessly communicate the signal. This makes the sensor unit suitable for use in remote locations without the need to make a wired electrical connection, as the output of the sensor unit may be wirelessly monitored.

Advantageously, the sensor unit is mountable on the latch. Mounting the sensor on the latch allows the sensor unit to detect a tubular adjacent to the latch on either side. This allows the use of a sensor that is simpler and has lower power consumption than a sensor mounted on the latch bracket to indirectly sense the tubular. As such, the sensor is capable of being run for extended periods of time from a remote power source such as a battery.

Thus, further according to the first aspect of the present invention, there is provided a fingerboard latch fingerboard latch assembly comprising: a latch bracket; a latch rotatably supported on the latch bracket; and a sensor unit as described herein mounted on the latch.

In one approach for mounting the sensor unit of the latch, the sensor unit may include a fitment that fits within an aperture in the latch. In that case, the sensor unit may further comprise a retaining member configured to engage with the fitment and retain the sensor unit in the aperture.

In one approach for mounting the sensor unit of the latch, the sensor unit may be encapsulated within the latch. In that case, the latch may be made from a material that is transparent to sensor technology of the sensor.

The sensor unit may have a housing that houses electronic components of the sensor unit. The housing may encapsulate the electronic components. The material of the housing may be a plastic that is resistant to drilling fluids, brine, cement, sunlight, ultraviolet (UV) radiation, grease, pipe dope, iron filings and other debris.

The sensor unit may incorporate shock adsorbing material or features to reduce shock to the electronic components. This may preserve components from fatigue failure as a results of repeated cycling at high shock on the latch arm or latch assembly.

Additionally, the sensor unit may comprise a near-field communication (NFC) unit arranged to perform near-field communication, thereby allowing it to be used for NFC. The NFC functionality may be used for a variety of functions providing communication with the sensor unit even though it is a completely sealed device without any external contact or switch.

In the case that the sensor unit includes an electromagnetic probe that is a coil that inductively senses the tubular, then this coil may be arranged to have a second function as an antenna for the NFC unit or for RF communications with a adjacent sensor unit. The one or more sensor coil or coils may incorporate coils for sensing tubular and NFC devices, or both. The coils may be mounted concentrically or adjacent to each other on a printed circuit board or flexible printed circuit board.

The sensor unit may further comprise an orientation sensor arranged to sense the orientation of the latch, the processor being arranged to derive a latch orientation signal representing the orientation of the latch. In that case, a wireless communication unit may be arranged to wirelessly communicate the tubular monitor signal and the latch orientation signal.

According to a second aspect of the present invention, there is provided a sensor unit for monitoring a piece of drilling equipment, wherein the sensor unit comprises: a sensor configured to sense an adjacent piece of drilling equipment; and a processor arranged to receive the output of the sensor and to generate an equipment monitor signal representing the presence or absence and/or representing the location of an adjacent piece of drilling equipment. The sensor unit in accordance with the second aspect of the present invention may have the same construction and function as the sensor unit in accordance with the first aspect of the present invention, except that a piece of drilling equipment is sensed instead of a tubular.

BRIEF DESCRIPTION OF THE FIGURES

Embodiments of the present invention will now be described by way of non-limitative example with reference to the accompanying drawings, of which

DETAILED DESCRIPTION

Figure 1:
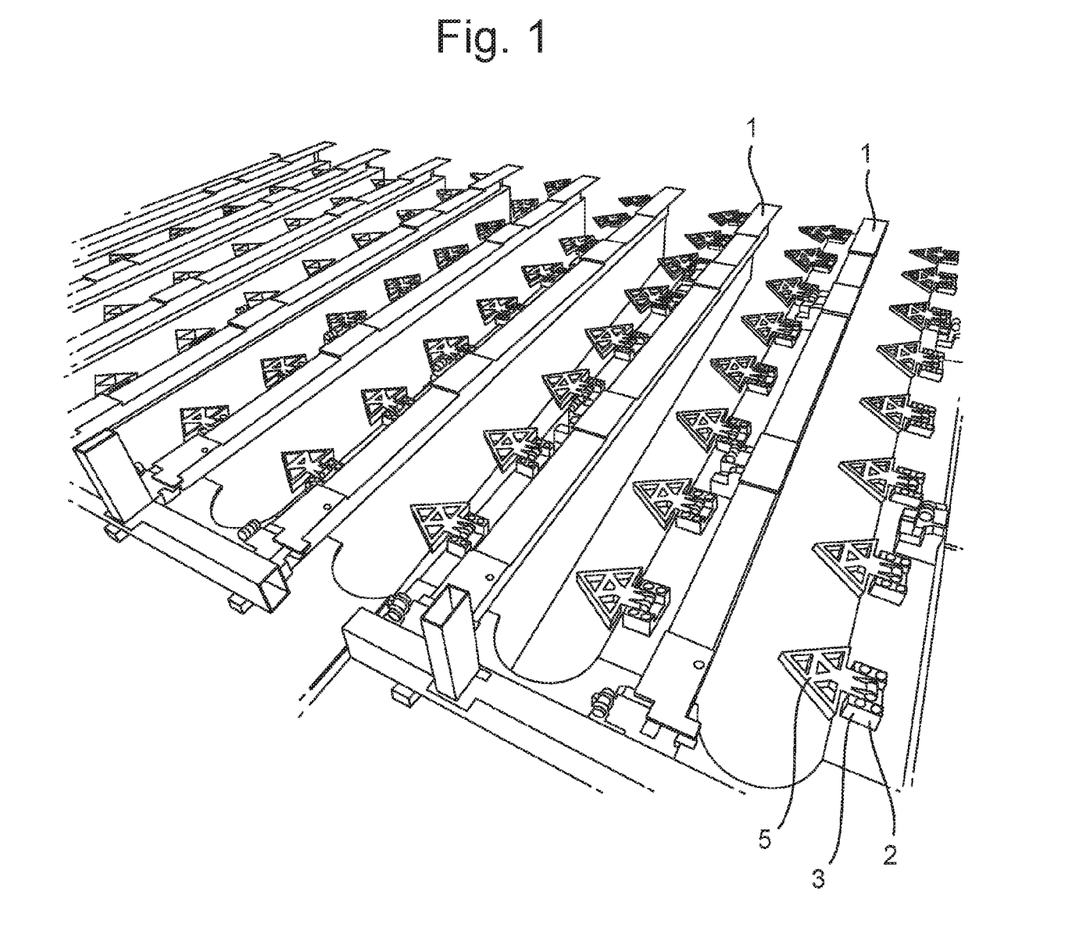
FIG. 1 is a photograph illustrating the typical configuration of a standard fingerboard array.
Figure 2:
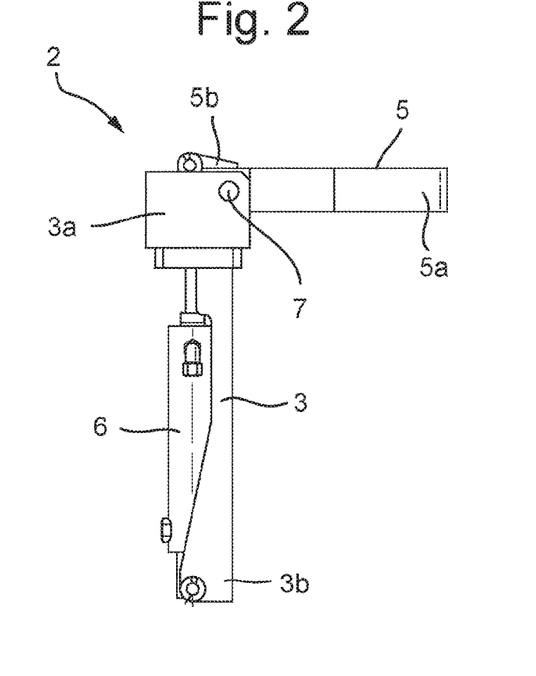
FIG. 2 is a rear view of the first latch assembly.
Figure 3:
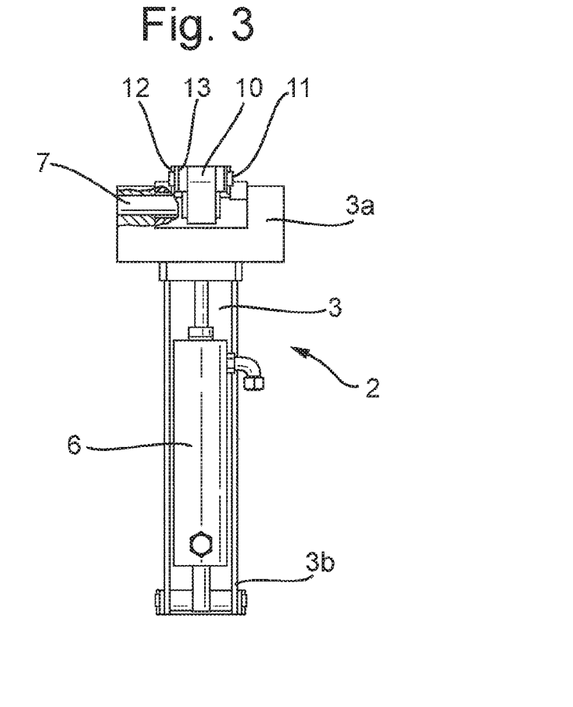
FIG. 3 is a side view of the first latch assembly.
Figure 4:
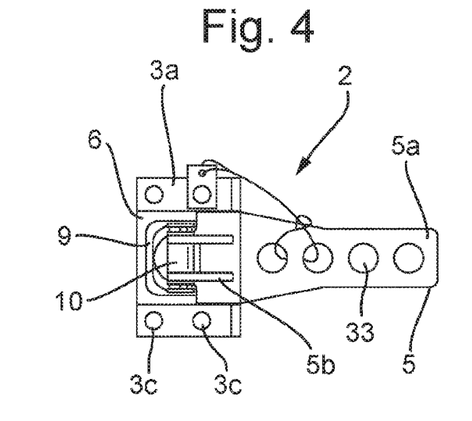
FIG. 4 is a top view of the first latch assembly.
Figure 5:
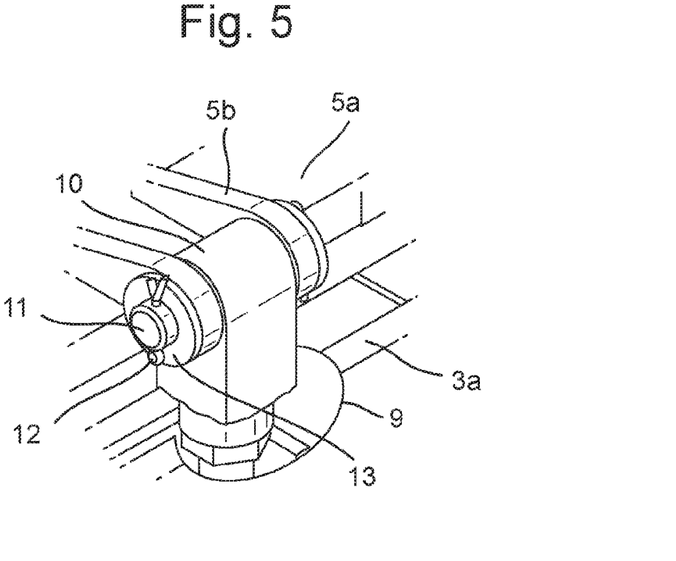
FIG. 5 is a close view of the latch pivot point, showing the various components.
Figure 6:
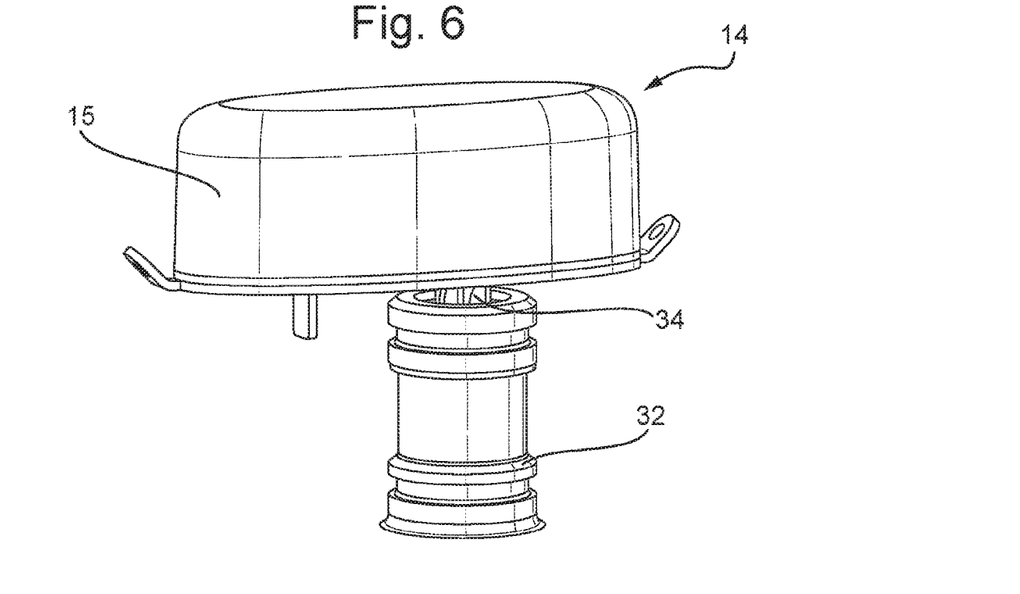
FIG. 6 is a side view of a sensor unit.
Figure 7:
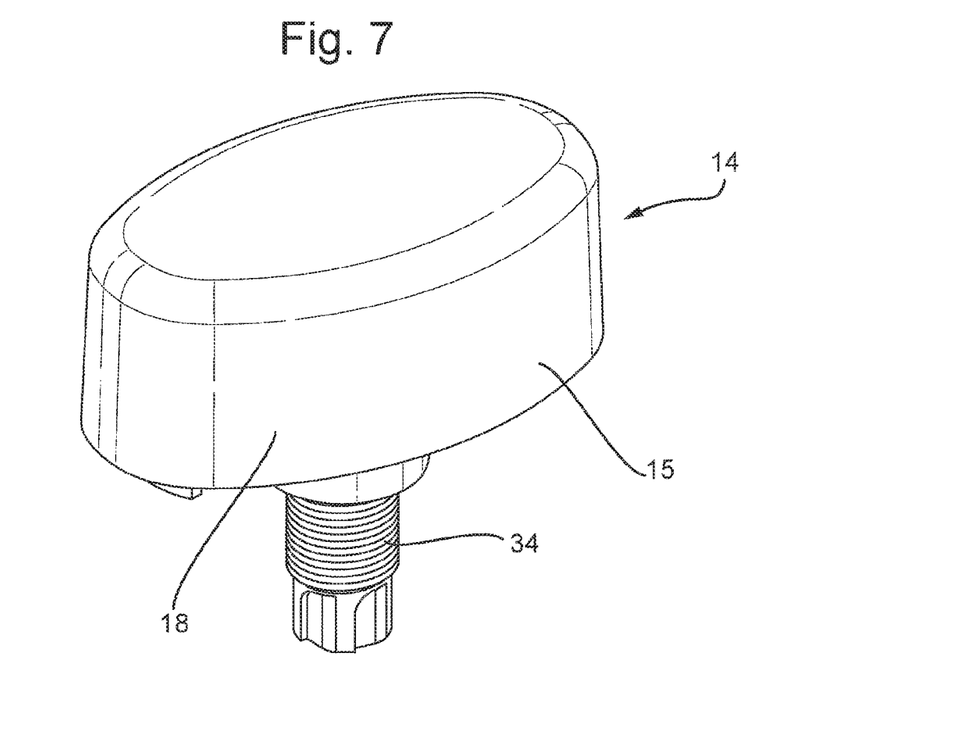
FIG. 7 is a perspective view of a sensor unit showing sensor surfaces.
Figure 8:
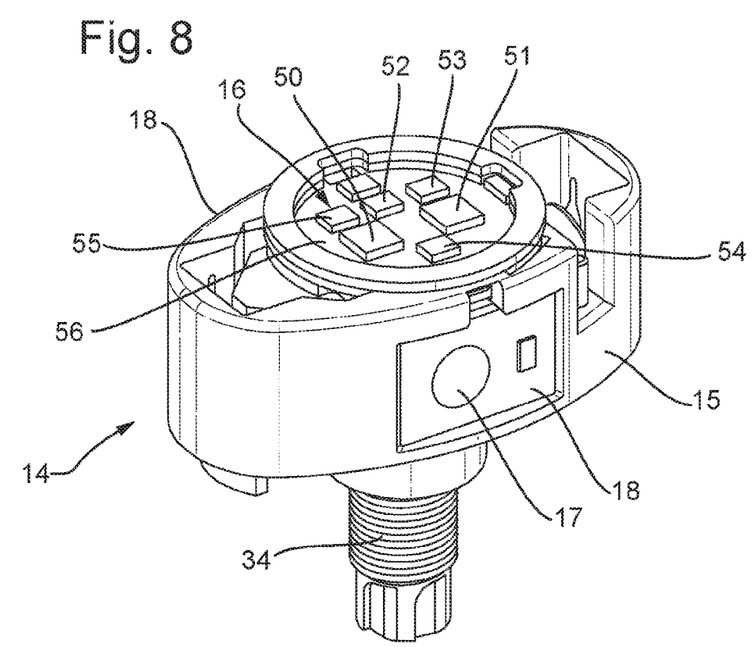
FIG. 8 is a view of a sensor unit with the housing removed.
Figure 9:
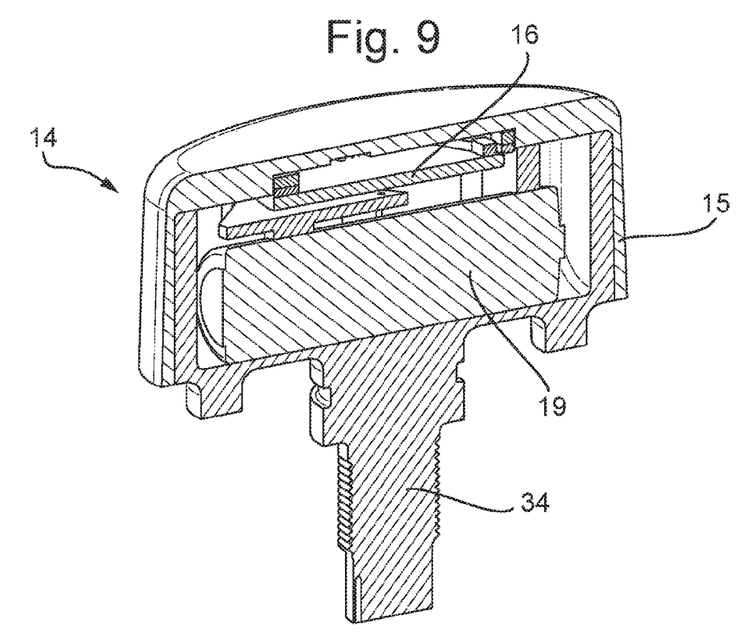
FIG. 9 is a cutaway view of a sensor unit showing internal components.

FIG. 1 shows the construction of a standard array of fingerboards 1 with plural fingerboard latch assemblies 2 mounted in an along each fingerboard 1. Each fingerboard latch assembly 2 comprises a latch bracket 3 and a latch 5 rotatably mounted on the latch bracket 3.

FIGS. 2 to 5 illustrate a specific fingerboard latch assembly 2 that will now be described. This fingerboard latch assembly 2 has a latch 5 configured to retain a drill pipe or casing. In general, the configuration of the latch 5 may be varied depending on the type of tubular with which the fingerboard latch assembly 2 is intended to be used. For example, the latches 5 shown in FIG. 1 have a different configuration. With appropriate choice of the configuration of the latch 5, the fingerboard latch assembly 2 may be used to retain a tubular of any type, for example a drill pipe, drill collar or casing.

The remainder of the fingerboard latch assembly 2 may have generally the same arrangement, as described below, for any configuration of the latch 5, including that shown in FIG. 1.

The fingerboard latch assembly 2 comprises a latch bracket 3 that comprises a latch bracket head 3a and an elongated body 3b extending downwardly from the bracket head 3a. The fingerboard latch assembly 2 is mounted to a fingerboard 1 using bolts 4 attached through bolt apertures 3c in the latch bracket 3. The fingerboard latch assembly 2 also comprises a pneumatic cylinder 6 secured to the latch bracket 3.

The fingerboard latch assembly 2 further comprises a bracket pin 7 connecting the latch 5 and bracket head 3a. The bracket pin 7 provides a pivot point allowing rotation of the latch 5 between an open and closed position (orientation). In FIGS. 1 to 5, the latch 5 is in the closed position in which the latch 5 extends horizontally. In the open position, the latch 5 extends vertically.

The latch 5 comprises an arm 5a that, in the closed position of the latch 5, extends forwardly from the bracket pin 7 for restraining a tubular. In the open position of the latch 5, the arm 5a of the latch 5 extends upwards from the bracket pin 7, allowing removal of a tubular. The arm 5a of the latch 5 is a movable metal member that creates a void between the fingerboard latch assemblies 2 and between the fingerboards 1 for a tubular to be secured. The latch 5 has apertures 33 formed in the arm 5a.

The latch 5 also comprises a crank portion 5b that extends rearwardly from the bracket pin 7. The latch bracket head 3a has an aperture 9 to provide clearance between the latch bracket 3 and the crank portion 5b, as the latch 5 rotates.

The pneumatic cylinder 6 comprises a piston head 10 which is connected to the crank portion 5b by way of a latch/cylinder pin 11. A split pin 12 prevents the latch/cylinder pin 11 from falling out of the piston head 10, and a washer 13 provides a wear barrier between the split pin 12 and piston head 10. Thus, the pneumatic cylinder 6 drives rotation of the latch 5 between the open and closed positions. To move the latch 5 from the closed position shown in FIGS. 1 to 5 into the open position in which the latch 5 extends vertically, the pneumatic cylinder 6 drives the piston head 10 downwardly.

FIGS. 6 to 9 illustrate a sensor unit 14 that comprises a housing 15 that houses electronic components including a power source 19, one or more sensors 18 for detecting an adjacent tubular 20, a module 16, which includes a processor 50 and a wireless communication unit 51, an NFC unit 52, an antenna 53, an orientation sensor 54 and a location device 55, all mounted on a printed circuit board 56. The sensor unit 14 may be mounted on the latch or latch bracket, and the sensor may be of a type that is relatively simple and of low power that, when mounted on the latch bracket or piperacker, remotely confirms the presence, and senses location, of tubular. Thus, an inexpensive sensor unit that is capable of being run from a standalone power source may be provided.

Figures 10, 11:
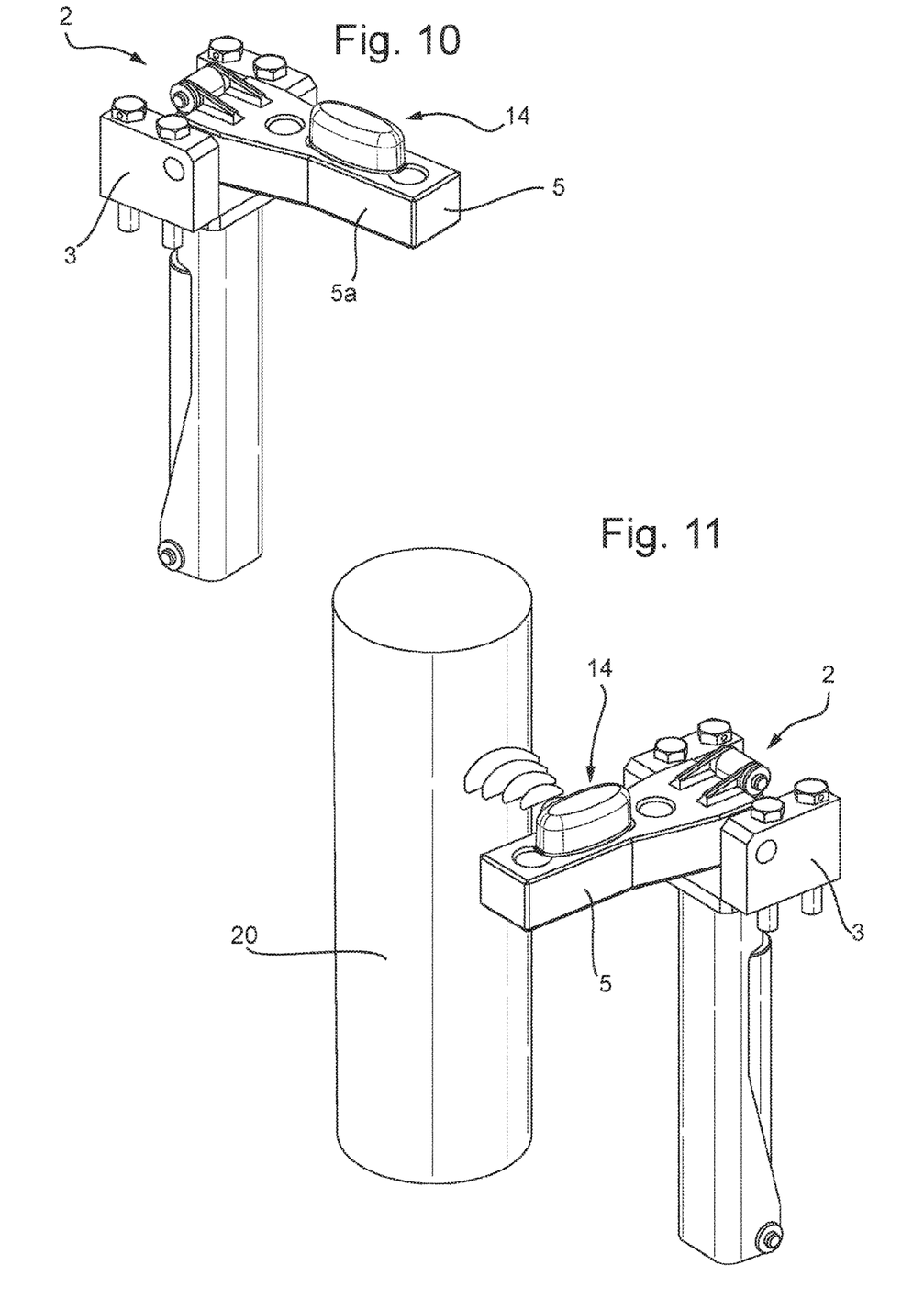
FIG. 10 is a perspective view of a sensor unit mounted to a latch in an aperture thereof.
FIG. 11 is a perspective view of a sensor unit mounted to the latch as shown in FIG. 10 detecting a tubular in an adjacent slot.

While the sensor unit 14 could be mounted on the bracket 3 of a fingerboard latch assembly 2, more preferably the sensor unit 14 is on the latch 5 of a fingerboard latch assembly 2. For example, the sensor unit 14 may be provided integrally with the latch assembly 5 during manufacture or may be configured to be attached to a pre-existing latch 5. In one alternative, the sensor unit 14 is configured to fit within an aperture 33 within the latch arm 5a of the latch 5, as shown in FIGS. 10 and 11. For mounting, the sensor unit 14 includes a fitment 34 that fits within the aperture 33. The sensor unit 14 further includes a retaining member 32 which is configured to engage with the fitment 34. After insertion of the fitment 34 through the aperture 33 in the latch 5, the retaining member 32 is provided on the opposite end of the aperture 33 to the housing 15 and engaged with the fitment to secure the sensor unit 14 to the latch 5. As shown, the retaining member 35 has an internal thread configured to screw into an external thread on the fitment 33. However, in general the retaining member 35 may be secured to the fitment 33 by any suitable means, for example a friction fit or a screw fit.

In another alternative, the sensor unit 14 is mounted to the latch 5 by the housing being provided with a screw portion configured to be screwed into a thread inside the aperture 33 of the latch 5. Thus a compact and easy to install sensor assembly may be provided.

Figure 12:
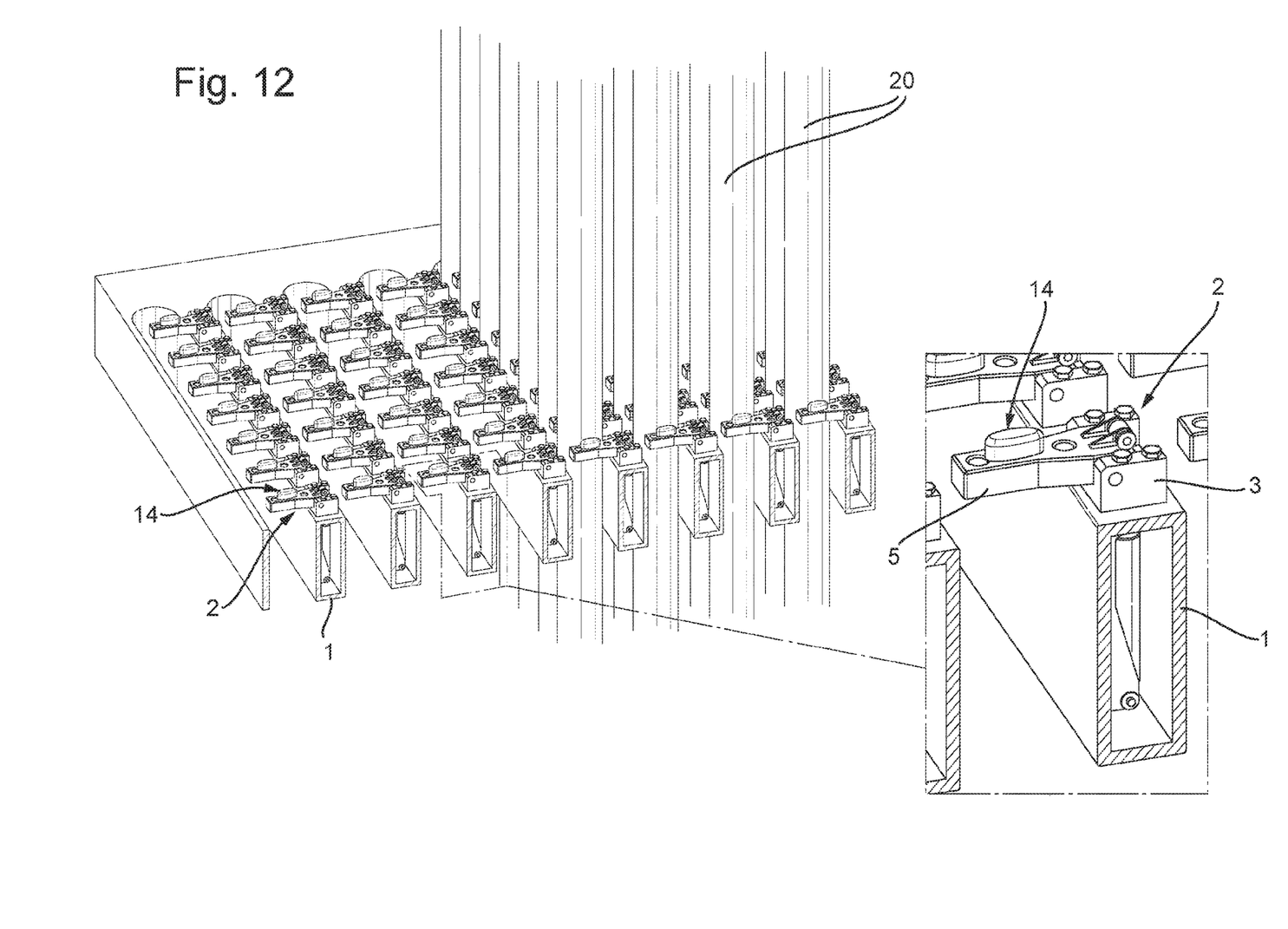
FIG. 12 is perspective view of an array of fingerboards with tubulars and sensor units mounted on fingerboard latch assemblies on the fingerboards.

In this manner, as shown in FIG. 12, sensor units 14 may be mounted on the latches 5 of all the fingerboard latch assemblies 2 on an array of fingerboards 1, for use in monitoring tubulars 20 stored therein, during handling of the tubulars 20 as they are loaded or removed.

Figure 13:
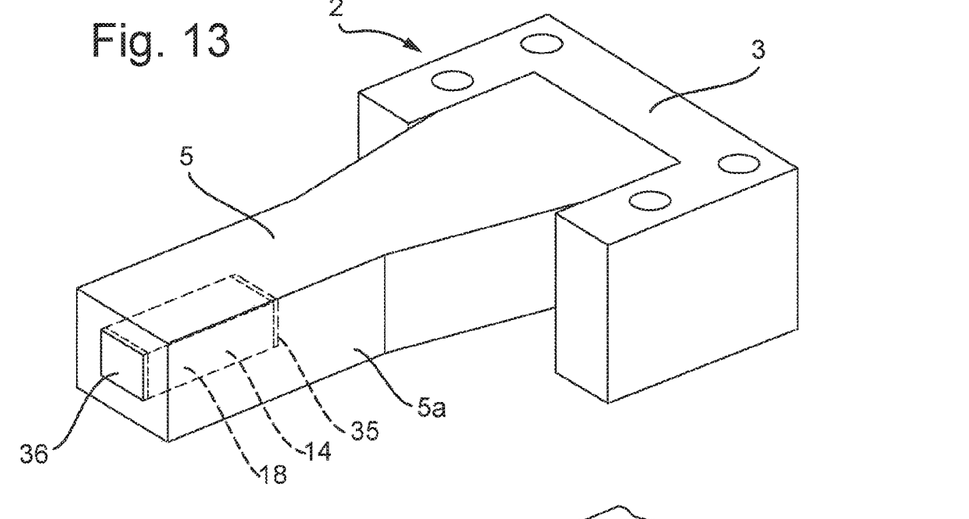
FIG. 13 is a perspective is a perspective view of a sensor unit mounted to a latch by being encapsulated therein.
Figure 14:
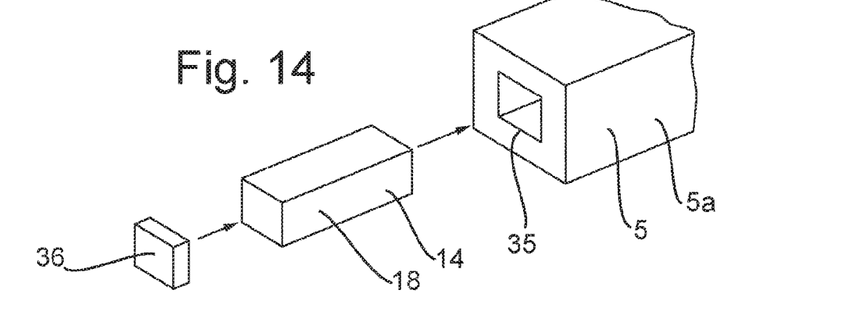
FIG. 14 shows a perspective view of encapsulation of the sensor unit into the latch.
Figure 15:
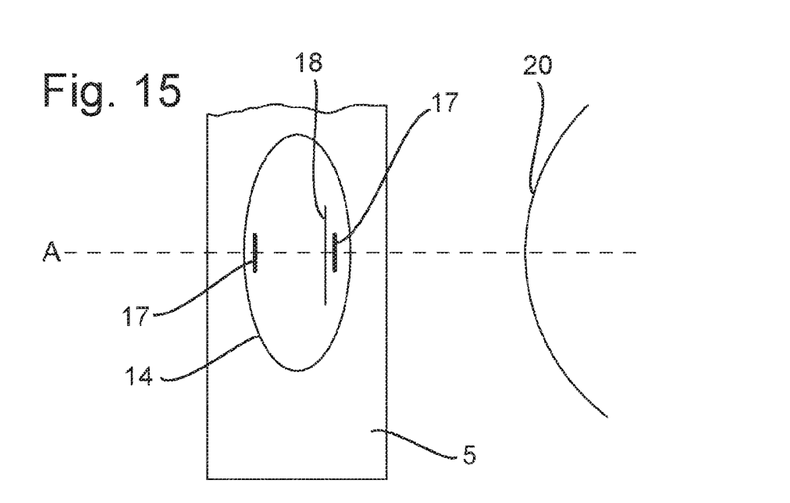
FIG. 15 is a plan view of the sensor unit with a modification to include two electromagnetic or ultrasonic or acoustic or inductive or microwave probes in the sensor.

In another alternative, the sensor unit 14 is encapsulated within the latch 5 as shown in FIG. 13. The latch arm 5a of the latch 5 has a recess 35 which in this example opens at the outer end of the latch arm 5a. The sensor unit 14 omits the fitment 34 and is inserted into the recess 35, as shown in FIG. 14. Optionally, the inner surface of the recess and the outer surface of the sensor unit 14 may have mating screw threads, so that the sensor unit 14 can be replaced, for example when the battery is depleted or maintenance is required. After insertion of the sensor unit 14, the sensor unit 14 is sealed within the recess 35 by a body 36 within the end of the recess 35. The body 36 may be material which acts as a sealant, for example, a potting compound, glue or epoxy. In an alternative form, the body 36 may be a lid, which may take any suitable form, for example a resilient member, threaded part, or screw. In this alternative the latch 5 is made from a material that is transparent to sensor technology of the sensor 18, for example a non-metallic material.

The sensor unit 14 may optionally further comprise a backup retention device that is configured to attach the sensor unit 14 to a component of the fingerboards 1 or fingerboard latch assembly 2. For example, the backup retention device may comprise a strand of wire or rope attached to both the latch 5 and the sensor unit 14. Thus, if the attachment of the sensor unit 14 fails, the backup retention device ensures that the sensor unit 14 does not fall and damage other equipment or personnel. A safer sensor unit 14 may thus be provided.

The sensor 18 will now be considered. The sensor 18 senses an adjacent tubular, for example as shown in FIG. 11.

In the example of FIGS. 6 to 9, the sensor 18 positioned on the side of the sensor unit 14, so that it is positioned facing the side of the latch 5 when the sensor unit 14 is mounted thereon. This facilitates the sensing operation, although other locations could be used for some types of sensing technology.

Alternatively, the sensor of the invention may be mounted elsewhere on the latch assembly 2, for example using the retaining bolts 3c it may be mounted on the bracket of the fingerboard latch assembly 3a and secured the bolts already provided 3c. In this manner the device may be mounted parallel or orthogonal to the latch arm 5 and the sensors 17 of sensor unit 14 used to detect the position or orientation of the latch arm, and/or the presence or absence of the tubular in the slot 2. Similarly, the sensor unit 14 may be mounted on the fingerboard 1 to detect tubular in a slot 2, the sensor 14 may be mounted on the fingerboard row 1 orthogonally, and along the row 1, to the slot 2 and sensors 17 used to detect the presence or absence of tubular in the slot.

The sensor 18 may be use any suitable position or proximity sensing technology such as ultrasonic, acoustic, electromagnetic (including magnetic, capacitive or inductive), magnetic, radio-frequency, microwave, ultra-wideband, optical (including laser), infrared, imaging or inductive sensing. The sensor technology used in the sensor 18 is selected for its shock and vibration resistance and may include means for damping shock, and filtering vibrations of various frequencies. Where the sensing technology is electromagnetic, the sensor unit 18 may include an electromagnetic probe 17, which may be for example a coil or a capacitive element. Examples of sensors that use an electromagnetic sensing technology and which may be applied here are disclosed in WO-2018/007804, US-2016/187275, EP-3,009594, US-2014/091785, EP-2338032, and WO-2007/099282 which are hereby incorporated by reference.

The sensor 18 may preferably use a low cost, low power position sensor technology such as an inductive sensor, eddy current sensor. RF ID, NFC or microwave sensor which may be for example configured as a position and orientation sensor. The sensor 18 may be based on inertial-ultrasonic hybrid tracking technology (e.g. Thales IS-900 system).

One option that may be employed is for the sensor 18 to include two electromagnetic probes which are spaced apart, for example as shown in FIG. 14, wherein the probes are spaced apart along a sideways axis A. This improves the sensing capability by allowing the sensor 18 to detect the position of the tubular 18 relative to the two electromagnetic probes 17. For example, the output of the sensor 18 may include a differential signal taken between the two electromagnetic probes 17. The two probes 17 will provide signals of different levels, in accordance with their different distances from the adjacent tubular 20, and so differential signal will allow detection of the side of the sensor unit 14 on which the tubular 20 is present. A common signal may be output together with the differential signal to indicate the presence of the tubular 20 nearby.

Optionally, plural sensors 18 may be provided.

The output of the sensors 18 represents the position of the tubular 20 with respect to the latch 5. The output may represent this in any number of ways, depending on the nature of the sensor 18. In the simplest case, the sensors 18 may be in an on or off state corresponding to two different positions of the adjacent tubular 20, e.g. present or absent in a slot, and when the latch 5 is closed. Alternatively, the output signals may convey more information. For example, the sensors 18 signals may identify the position of a distant tubular 20 being moved by a piperacker into a slot. Alternatively, the output of the sensors 18 may be a change with the speed or closing rate of tubular 20 to identify the position of the tubular 20. In another embodiment, a sensor 18 may identify that the tubular 20 is secured in an adjacent slot, while latch 5 is closed, or output from a sensor 18 source may indicate that the slot is open and no tubular is present.

The sensor 18 may also be configured to inductively sense the presence or absence of a proximate object. The sensor 18 may be used to communicate with or identify the tubular by means of RFID (Radio-Frequency Identification) and/or NFC, for example to log each tubular as it is added to the fingerboard 1 or passes the fingerboard latch assembly 2 on which the sensor unit 14 is mounted.

The processor 50 receives the output of the sensor 18 and uses it to generate a tubular monitor signal which may represent the presence or absence of an adjacent tubular 20 or may represent the position of an adjacent tubular. The tubular signal may simply represent the output of the sensor 18, or alternatively processor may process the output of the sensor 18 to derive additional parameters that are also represented by the tubular signal. For example, if the output of the sensor 18 represents the position of the tubular 20, the processor may derive the speed of movement of the tubular 20 and include that in the tubular monitor signal. The signal could monitor aspects of condition or failure prediction such vibration, sway, shock, acceleration or, using RFID or barcodes or another unique identifier, identify tubular in the slot.

The tubular monitor signal generated by the processor 50 is supplied to the wireless communication unit 51 which wirelessly communicates it. The wireless communication unit 51 may provide any type of wireless communication, including for example acoustic, microwave, ultrasonic or optical communication, but is typically a radio communication unit arranged to transmit signals using radio frequency (RF) electromagnetic waves. A radio frequency may be selected that has a wavelength that does not suffer from attenuation or reflections from drilling pipe and tubulars secured in the fingerboards 1. To minimise reflections and loss of signal, a radio frequency may be selected that has a wavelength that is less than the minimum spacing between plural fingerboard latch assemblies 2 mounted on a fingerboard 1 and hence less than a minimum spacing between tubulars stored therein. The frequency selected should not interfere with marine communications equipment. Optionally, the frequency selected may be between 2 and 3 GHz.

The wireless communication unit 51 may be unidirectional and merely transmit information from the sensor unit 30, or may be bidirectional and transmit and receive information. The wireless communication unit 51 may implement any suitable transmission protocol.

Such wireless communication allows for the sensor unit 14 to be a wireless device that is suitable for use in remote locations without the need to make an electrical connection. The wireless communication unit 51 provides instant indication of tubular security, which may be monitored by a person or remotely monitored via a screen such as HMI. Signal processing may be used to provide automated monitoring so as to interlock items of automation equipment such as a piperacker. The sensor unit 14 may also incorporate sensors to measure position of the latch 5.

The wireless communication unit 51 may communicate using the antenna 53. Alternatively, the wireless communication unit 51 may communicate using a probe 17 of the sensor unit 18 in the case that the probe 17 is a coil.

A network of wireless gateways transceivers is provided to communicate with the sensor unit 14, and with each other, to relay signals for processing and display of the tubular monitor signal to an operator. These gateways may be located around the fingerboards 5, optionally at valve cabinets, to maximise reception and signal coverage. Optionally, these gateways may be located at four locations, east, west, north and south of the fingerboard. A further transceiver is mounted at, or near, the drillers' cabin and/or the Local Equipment Room (LER). The transceiver wireless gateway at the drillers' cabin and/or LER is the central transceiver which receives signals from the sensor units 14 and the network wireless gateway transceivers around the fingerboard 5.

Thus, a more reliable solution may be provided that clearly indicates when the tubular is safely secured. The goal is to confirm the location of a tubular 20 to prevent latch 5 opening while a tubular 20 is present in an adjacent slot.

The tubular monitor signal may used as an input to a handling system that handles the tubular or a control system controls the operation of associated fingerboard latch assemblies, for example the fingerboard latch assembly to which the tubular is adjacent and fingerboard latch assemblies which secure the same tubular or are in the same array of fingerboards. For example, the sensor unit may be used to track a tubular as it closes on a fingerboard latch and its output used in feedback to decelerate the motion of the piperacker moving the tubular. Likewise, the sensor unit could be used to interlock the latches or guide-head claws to ensure that pipe is not released until the latch is down and it is secure.

Similarly, the sensor unit 14 includes an NFC unit 52 that are configured to communicate wirelessly with proximate devices using near field communication. The NFC unit 52 may communicate using the coil 53 or a separate coil provided in the sensor device 14. Alternatively, the wireless communication unit 51 may communicate using a probe 17 of the sensor unit 18 in the case that the probe 17 is a coil.

The NFC unit 52 may be used to communicate with an external device during installation or maintenance of the sensor unit 14, for example to interrogate or update software processed on the sensor unit 14 when completely sealed inside the housing 15, or deactivate the unit placing it in a low power or 'off' state prior to shipping or storage without the need for physical switches or external contacts. The NFC functionality may be used to switch on, or off, the sensor unit 14, which is a completely sealed device, without any external contact or switch. The NFC unit 52 may be used to put the sensor unit 14 in a dormant or low power state prior to shipping, and to 'wake' up the device via NFC on arrival or when installed and put into operation. Similarly, the NFC unit 52 may be used to update the device firmware and software, or to interrogate the device during debugging. In these ways power may be saved during manufacture, assembly, transportation and storage, ready for reactivating on installation.

The power source 19 may be any type of standalone power source that is capable of providing power to the sensor unit 14. For example, the power source 19 may comprise a battery, solar cell and/or capacitor. The power source 19 may optionally comprise an energy harvesting device that is configured to harvest energy from the fingerboards 1 or fingerboard latch assembly 2. For example, the power source 19 may be configured to harvest energy from the motion, shock or vibration of the latch 5. The power source 19 may be provided integral with the sensor assembly 14, or removably attached to the sensor assembly 14. A sensor assembly that is easily maintained, and intrinsically safe, may thus be provided.

The power source 19 may be a battery with long life characteristics. The battery is ideally compact in format and can fit within the sensor unit 14. To avoid frequent replacement of the sensor unit 14, the battery ideally will have sufficient capacity to power the sensor unit 14 for tens of thousands of latch cycles over several years (e.g. 25,000 latch cycles and five years). Optionally the battery utilised may be a Lithium Thionyl Chloride battery that has been selected and configured to last the lifetime of the equipment. The orientation sensor 54 senses the orientation of the latch 5. The processor 50 receives the output of the orientation sensor 54 and derives a latch orientation signal representing the orientation of the latch. The wireless communication unit 51 wirelessly communicate the latch orientation signal together with the tubular monitor signal. Thus, the latch orientation signal may also be used as an input to a handling system that handles the tubular or a control system controls the operation of associated fingerboard latch assemblies 2.

The orientation sensor may take the form disclosed in WO-2018/087511 (PCT/GB2017/052494) and WO-2018/007804 (PCT/GB2017/051972), which are hereby incorporated by reference. The orientation sensor 54 takes measurements that are dependent on the orientation of the sensor unit 14. In general, the orientation sensor 54 may be any type of sensor suitable for detecting the orientation of the latch 5. The orientation sensor 54 may preferably be a low power sensor such as a MEMS (Micro-Electro-Mechanical Systems) sensor, which may be for example configured as an inclinometer, accelerometer or gyroscope. Examples of alternative types of sensor that could be used for the orientation sensor 54 include: tilt ball sensor; infrared; laser; acoustic; capacitive; magnetic, inductive, electro-magnetic, antenna polarisation or Hall-effect sensors. As the sensor unit 14 is mounted on the latch, the orientation sensor 54 may be of a type that is relatively simple and of low power compared to a sensor mounted on the latch bracket that indirectly senses the latch 5.

The processor 50 is supplied with output signal representing the measurements from the orientation sensor 54 and processes them. The processor 50 derives, from the measurements, an orientation signal representing the orientation of the latch 5 with respect to the latch bracket 3. In general terms, this is possible because the sensor unit 14 is mounted in the latch 5 and so the orientation of the sensor unit 14 is indicative of the orientation of the latch 5.

The orientation signal may represent the value of the present orientation of the latch 5 across its range of movement with respect to the latch bracket 3. In this case, the value of the present orientation may be derived from the measurements from the orientation sensor 54 using a simple geometrical calculation.

Alternatively, the orientation signal may simply represent that the present orientation of the latch is an open state, a closed state, or an intermediate state. For example the open state and the closed state may be taken to correspond to the latch 5 being within a predetermined range of angles, for example 6 degrees, of the open position and the closed position, respectively. In this case, the open and closed position may be derived by applying a suitable threshold condition on the successive measurements from the orientation sensor 54. In this case, an orientation signal that represents the value of the orientation of the latch 5 may or may not be explicitly derived, but the threshold condition is related to the measurements from the orientation sensor 54 on the basis of similar geometrical calculation.

The location device 55 is a device that detects the location of the sensor unit 14 on the fingerboard 1. The location device 55 may use any suitable location technology. For example, the location device 55 may be a Global Positioning Satellite (GPS) location device or an ultrawideband radio frequency location device that is based on RF triangulation technology. The location device 55 may be used to confirm and track location of the sensor unit 14 in the derrick and on the fingerboard 1.

Also the sensor unit 14 may incorporate RFID to record unit ID without reading labelling or barcodes.

The processor 50 may include metadata in the tubular monitor signal. Such metadata may be data which is logged electronically by the sensor units 14 monitoring the tubulars 20 throughout the fingerboard 1. The metadata may include any of: sensor ID, latch ID, date, time, number of tubulars detected, sensor face detecting tubular, number of latch cycles, count of latch open, count of latch closed, sensor signal level, sensor battery power, self-diagnostic information, shock, vibration, position, angle, speed, acceleration, logged RFID information. The metadata may also include the location of the sensor unit detected by the location device 55.

Such metadata may be logged and analysed to identify latches that are not performing to specification, or may be in need of maintenance or replacement. These data may be analysed for condition-based monitoring the latches to minimise downtime and, by planning maintenance based on likelihood of latch failure, maximise fingerboard availability and operational efficiency. In addition, the data logs and meta-data may be presented to manufacturers, suppliers, customers or regulators to validate equipment warranty, indicate safety performance and to demonstrate compliance with best practice and compliance with regulations.

The housing 15 will now be discussed. The housing 15 encapsulates the electronic components. The sensor 14 may be encapsulated inside the housing using an epoxy or elastomer or suitable potting compound.

The housing 15 is made from a material that is transparent to the sensor technology used by the sensor 18. The material of the housing 15 is selected to be resistant to drilling fluids, brine, salt-spray, cement, sunlight, UV radiation, grease, pipe dope, iron filings and other debris. The material is selected to withstand shock, vibration, temperature extremes, ice, direct sunlight, UV degradation and washing with a high-pressure jet of water at over 200 Psi.

Suitable materials for the housing include composite, carbon-fibre, glass-reinforced fibre, plastic, polymer, thermoplastic, polyether ether ketone (PEEK), PEAK, PEEK reinforced with carbon fibre and other engineering thermoplastics and composites or elastomers, for example a rubber. Advantageously, the material may be PEEK which is a plastic which is chemically inert. In particular, grades of PEEK that include carbon such as TECAPEEK black, and TECAPEEK CF30 black (manufactured by Ensinger, UK) and that use Victrex PEEK 450G as the base component. These grades of PEEK may be welded to seal the device and provide IP67 or IP68 water-proofing as well as certification to IECEx and ATEX standards for use in flammable atmospheres.

The sensor unit 14 may also incorporate non-metallic lining materials to provide additional friction, integrity and sealing to keep out oils and debris. These may be incorporate 'o' rings that provide compression to accommodate latch tolerances for the dimensions of the latch arm which can be broad. The non-metallic materials may be of a type known to be suitable for use as a lining of a in oil and gas applications. Suitable materials for the non-metallic lining can include, without limitation: polyisoprene, styrene butadiene rubber, ethylene propylene diene monomer rubber, polychloroprene rubber, chlorosulphonated polyethylene rubber, 'Viton' or nitrile butadiene rubber. The material may also be a mixture of these and/or other materials.

The sensor unit 14 incorporates shock adsorbing material or features inside housing 15a to absorb shock and reduce the shock to the electronic components. This may preserve components. from fatigue failure as a result of repeated cycling at high shock on the latch arm or latch assembly.

The shock adsorbing material may be fabricated to have an aspect ratio that allows the electronic components to move by at least 1 mm in any direction.

The shock adsorbing material or features may reduce the shock transmitted from the latch assembly 2 to the components 16 from over 1,000 g to 700 g or less. The shock adsorbing material or features may be arranged to reduce shock to the electronic components to less than 400 g. In this application, shock levels in the region of 2000 g can be experienced by the latch and thus the electronic components must be protected from this. In most cases electronic components are capable of withstanding a limited number of large shock loads however fatigue failures generated by continuous cycling of high shock levels can dramatically reduce the ability of electronic components to withstand shock. Electronic component manufactures often provide published data regarding single incident shock survival figures but do not provide data relating to repeated shock loading and thus it is essential that these survival levels are established and the shock absorbing solution dampens the shock levels to an acceptable point.

Desirably, the shock adsorbing material or features have a low percentage compression set, for example a compression set of less than 30% ideally less that 15%, in order to provide long term, consistent shock absorption.

Figure 16:
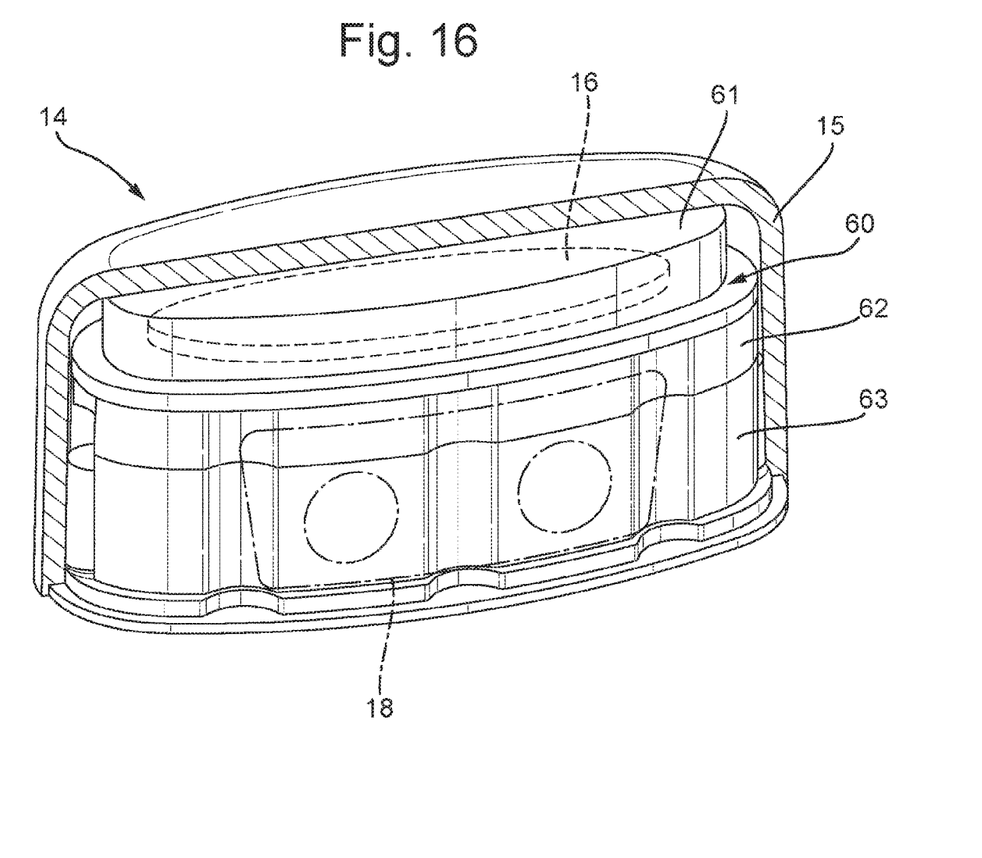
FIG. 16 is perspective sectional view of a sensor unit with foam shock absorbers positioned above and below the electronic components.

FIG. 16 shows an example of the sensor unit 14 where shock adsorbing material 60 is provided inside the housing 15, including a first part 61 between the board 16 and the housing 15a, a second part between the module 16 and the power source 19, and a third part 63 between the sensor 18 and the housing 15.

Such shock adsorbing material may be a suitable damping material that decelerates mass such as a foam. The foam may be either an open or closed cell material. Foams with small controlled voids such as microcellular foams allow for controlled cushioning. Suitable materials include but are not limited to Urethanes, such as Poron, or Silicones, such as NORSEAL.

The material may be fabricated with dimensions that provide sufficient deflection and damping or deflection to adsorb shock to the technology or circuit board 16. This can be achieved by adjusting the volume of the shock absorbing material in terms of both surface area in order to alter the rate of compression vs applied load and the thickness in order to alter the available deflection. Both factors dramatically effect the level of shock absorption provided.

Figure 17:
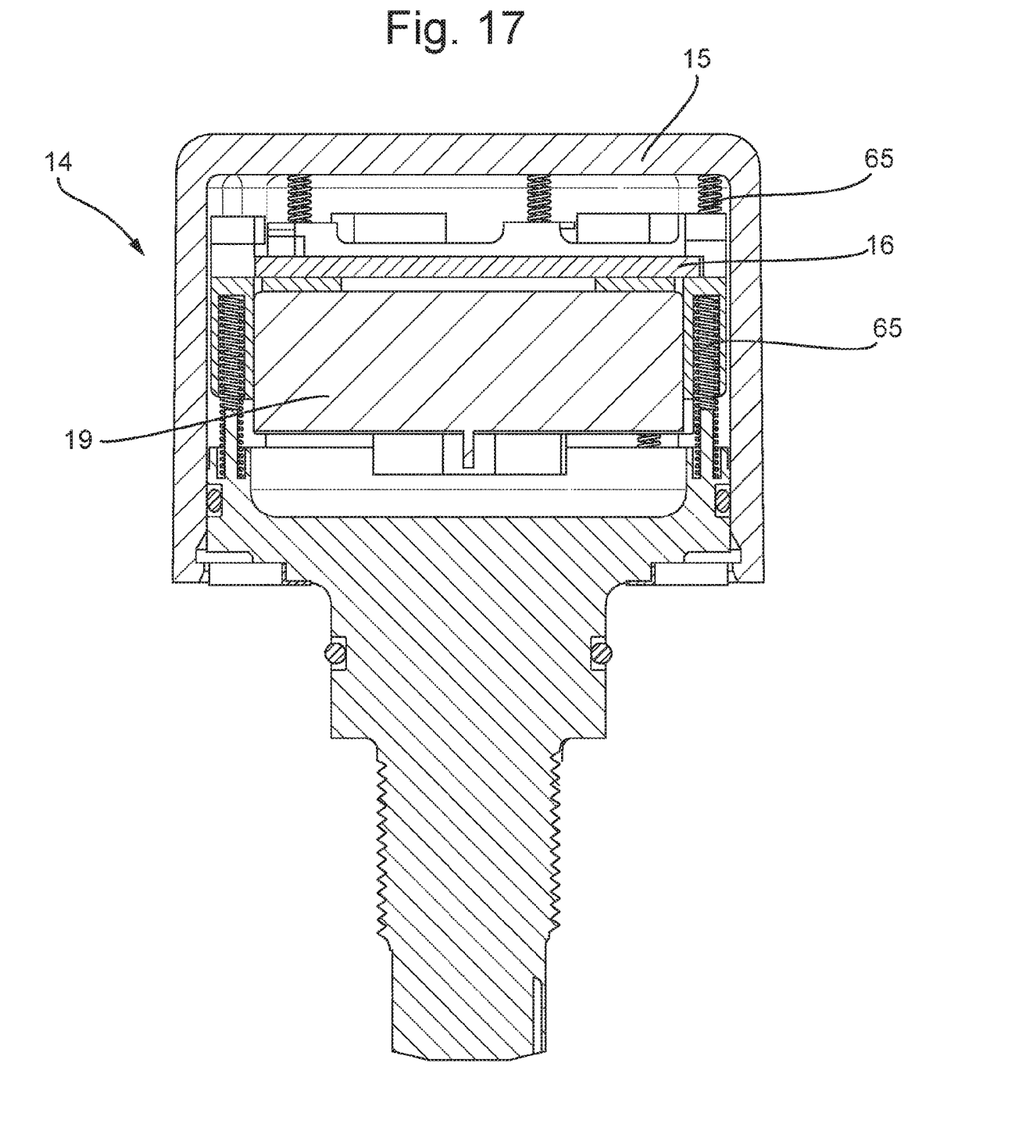
FIG. 17 is side, cross-sectional view of a sensor unit with shock absorbing springs positioned above and below the electronics.

FIG. 17 shows an example of the sensor unit 14 where shock adsorbing features in the form of springs 65 (which could be replaced by other types of resilient element such as a piece of resilient material or a flexure) between the module 16 and the housing 15 such that relative movement is permitted and is dampened by the sprung member. Alternatively, such a feature could take the form of a component that is permitted to flex within its elastic limits. This could be achieved by providing components manufactured with a lattice or honeycomb structure to provide distortion. Such a feature would need to be designed such that it provides a suitable stiffness in order to alter the rate of compression vs applied load and level of distortion in order to alter the available deflection.

It should also be noted that the stiffness of any shock absorbing system must also be considered in terms of resonance as a resonating system is likely to generate fatigue failure of various electronic components.

The sensor unit described above may alternatively be used to monitor a piece of drilling equipment rather than the tubular, for example tongs on roughnecks, guide head claws used to secure tubulars around the derrick and to monitor their position and condition to demonstrate the tubular is secure, and slips used to secure pipe which may become misaligned while drilling.

According to a further aspect of the present invention, there is provided a sensor unit for a fingerboard latch assembly comprising a latch bracket and a latch rotatably supported on the latch bracket, the sensor unit comprising: a sensor configured to sense the position of a tubular; and a processor, the output of the sensor being processed in accordance with the position of the tubular sensed by the sensor.

According to a further aspect of the present invention, there is provided a sensor unit for a fingerboard latch assembly comprising a latch bracket and a latch rotatably supported on the latch bracket, the sensor unit comprising: a sensor configured to sense the presence of a radio frequency field, a processor, the output of the sensor being processed in accordance with the RF field sensed by the sensor, and a sensor coil configured for transmitting and receiving near field communications.

According to a further aspect of the present invention, there is provided a sensor unit for a fingerboard latch assembly comprising a latch bracket and a latch rotatably supported on the latch bracket, the sensor unit comprising: a sensor configured to sense the position of an adjacent tubular; and a securing member to retain the sensor unit through a hole in the latch.

According to a further aspect of the present invention, there is provided a sensor unit for monitoring a piece of drilling equipment, the sensor unit comprising: a power source, a processor, a position sensor, a sensor coil configured to communicate using near field radio frequency communications; and a securing member to retain the sensor unit to the drilling equipment.

All features of the first aspect of the present invention, features described in the detailed description and features defined in the claims may be applied equally to the second and further aspects of the present invention.

Also, the following features may be applied in any of the first and second aspect of the present invention or the further aspects, in any combination.

The sensor unit may be mountable or mounted on the latch.

The sensor unit may be configured to confirm the presence or absence of a tubular.

The sensor unit may be configured to measure the speed and direction of a tubular.

The sensor unit may be mountable or mounted on the latch assembly or bracket.

The sensor unit may be configured to measure the orientation or speed or direction of a latch.

The sensor unit may be manufactured from PEEK plastic.

The sensor unit may incorporate non-metallic lining materials.

The sensor unit may incorporate non-metallic lining materials.

The sensor unit may communicate wirelessly.

The sensor unit may communicate wirelessly utilising a wavelength that is less than the minimum spacing between tubulars mounted in the fingerboard.

The sensor unit may utilise a Lithium Thionyl Chloride battery to provide power over prolonged periods of operation.

The sensor unit may communicate wirelessly via a network of transceivers, wherein the transceivers are mountable to existing equipment around the derrick and communicate wirelessly with the sensor unit and each other to relay data from the sensor unit to a central processor and display.

The outputs of more than one sensor unit may be combined to compare the positions of more than one tubular and detect anomalies in tubular position.

The output of a sensor unit may including metadata which is logged electronically including date and time.

The data logged may include RFID, sensor identity, tubular presence, tubular absence, location of tubular, latch identity, number of latch cycles, number of tubular detections, count of open, count of closed, speed, acceleration, angle, GPS data, battery charge, signal level.

The sensor unit may incorporates GPS technology to provide location of the sensor unit on the fingerboard.

The sensor unit may have a housing fabricated from a UV-resistant plastic.

The sensor unit may have a housing incorporating shock adsorbing material or features to reduce shock to internal components to less than 400 g and preserve components from fatigue failure or damage.

The sensor unit may have a housing incorporating shock adsorbing material or features to allow internal electronic components to move by at least 1 mm in any direction.

The sensor unit may have a housing incorporating shock adsorbing material, foam or features that have a low percentage compression set of less than 30%.

The sensor unit may be integrally provided within a fingerboard latch assembly during manufacture.

The sensor unit may be encapsulated within the latch arm of the fingerboard latch assembly, or provided within a cavity inside the latch arm of the fingerboard latch assembly.

The sensor unit may confirm the presence or absence of tubular in a fingerboard or bellyboard using position sensing technology such as ultrasonic, acoustic, electromagnetic, magnetic, radio-frequency, optical, infrared, imaging or inductive sensing.

The sensor unit may be provided integrally inside the latch arm, and whereby the arm is manufactured from a material that is transparent to sensor technologies.

The sensor unit may incorporate ultrawideband RF technology to triangulate location of the sensor unit on the derrick.

The invention claimed is:

1. A fingerboard latch assembly comprising:
   a latch bracket;
   a latch rotatably mounted on the latch bracket; and
   a sensor unit mounted on the latch for monitoring a tubular adjacent the fingerboard latch assembly, wherein the sensor unit comprises:
   a sensor configured to sense an adjacent tubular, and
   a processor arranged to receive an output of the sensor and to generate a tubular monitor signal representing a presence or absence and/or representing a position of the adjacent tubular.

2. A fingerboard latch assembly according to claim 1, where the sensor unit further comprises a wireless communication unit arranged to wirelessly communicate the tubular monitor signal.

3. A fingerboard latch assembly according to claim 2, wherein the wireless communication unit comprises a radio communication unit.

4. A fingerboard latch assembly according to claim 3, where the wireless communication unit is arranged to wirelessly communicate utilising a wavelength that is less than the minimum spacing between tubulars mounted in the fingerboard latch assembly.

5. A fingerboard latch assembly according to claim 1, wherein the sensor is configured to sense the position of the adjacent tubular.

6. A fingerboard latch assembly according to claim 1, wherein the sensor is further configured to sense a speed and direction of movement of the adjacent tubular, and wherein the tubular monitor signal further represents the speed and direction of movement of the adjacent tubular.

7. A fingerboard latch assembly according to claim 1, wherein the sensor implements one of ultrasonic, acoustic, electromagnetic, magnetic, radio-frequency, microwave, ultra-wideband, optical, infrared, imaging or inductive sensing.

8. A fingerboard latch assembly according to claim 1, wherein the sensor unit includes a fitment that fits within an aperture in the latch.

9. A fingerboard latch assembly according to claim 8, wherein the sensor unit further comprises a retaining member configured to engage with the fitment and retain the sensor unit in the aperture.

10. A fingerboard latch assembly according to claim 1, wherein the sensor unit is encapsulated within the latch.

11. A fingerboard latch assembly according to claim 10, wherein the latch is made from a material that is transparent to sensor technology of the sensor.

12. A fingerboard latch assembly according to claim 1, further comprising a housing that houses electronic components of the sensor unit.

13. A fingerboard latch assembly according to claim 12, wherein the housing is made from a plastic that is resistant to ultraviolet radiation, for example polyether ether ketone.

14. A fingerboard latch assembly according to claim 12, wherein the sensor unit incorporates shock adsorbing material or features arranged to reduce shock to the electronic components.

15. A fingerboard latch assembly according to claim 14, wherein the shock adsorbing material or features to reduce shock to the electronic components to less than 400 g.

16. A fingerboard latch assembly according to claim 14, wherein the shock adsorbing material or features allow internal electronic components to move by at least 1 mm in any direction.

17. A fingerboard latch assembly according to claim 14, wherein the shock adsorbing material or features that have a compression set of less than 30%.

18. A fingerboard latch assembly according to claim 1, further comprising a near-field communication unit arranged to perform near-field communication.

19. A fingerboard latch assembly according to claim 18, wherein the sensor includes an electromagnetic probe that is a coil, and the near-field communication unit is arranged to perform near-field communication using the coil as an antenna.

20. A fingerboard latch assembly according to claim 1, wherein the sensor includes two electromagnetic probes spaced apart.

21. A fingerboard latch assembly according to claim 20, wherein the output of the sensor is a differential signal taken between the two electromagnetic probes.

22. A fingerboard latch assembly according to claim 20, wherein the output of the sensor indicates on which side of the latch a tubular is present.

23. A fingerboard latch assembly according to claim 1, wherein the tubular monitor signal further comprises metadata which is logged electronically including date and time.

24. A fingerboard latch assembly according to claim 23, wherein the metadata includes any one or more of: RFID, sensor identity, tubular presence, tubular absence, latch identity, number of latch cycles, number of tubular detections, count of open, count of closed, speed, acceleration, angle, vibration, battery charge, signal level.

25. A fingerboard latch assembly according to claim 23, wherein the sensor unit further includes a location device arranged to detect a location of the sensor unit on the fingerboard latch assembly, and the metadata includes the location of the sensor unit detected by the location device.

26. A fingerboard latch assembly according to claim 25, wherein the location device is a Global Positioning Satellite location device or an ultrawideband radio frequency location device.

27. A fingerboard latch assembly according to claim 1, further comprising:
   an orientation sensor arranged to sense an orientation of the latch, the processor being arranged to derive a latch orientation signal representing the orientation of the latch; and
   a wireless communication unit arranged to wirelessly communicate the tubular monitor signal and the latch orientation signal.

28. A fingerboard latch assembly according to claim 1, wherein:
   the sensor comprises two ultrasonic probes that are spaced apart along a sideways axis of the latch, and
   the processor is arranged to receive the output of the two ultrasonic probes and to generate the tubular monitor signal representing the presence or absence of an adjacent tubular and, when present, a side of the latch on which the adjacent tubular is present.

* * * * *